(12) United States Patent
Lombardo

(10) Patent No.: US 12,343,830 B2
(45) Date of Patent: Jul. 1, 2025

(54) AUTOMATIC SEAL APPLICATOR APPARATUS AND METHODS OF USING THE SAME

(71) Applicant: Steven Lombardo, Roscoe, IL (US)

(72) Inventor: Steven Lombardo, Roscoe, IL (US)

( * ) Notice: Subject to any disclaimer, the term of this patent is extended or adjusted under 35 U.S.C. 154(b) by 527 days.

(21) Appl. No.: 17/895,717

(22) Filed: Aug. 25, 2022

(65) Prior Publication Data

US 2023/0066758 A1 Mar. 2, 2023

Related U.S. Application Data

(60) Provisional application No. 63/237,433, filed on Aug. 26, 2021.

(51) Int. Cl.
*B23P 19/08* (2006.01)

(52) U.S. Cl.
CPC .................. *B23P 19/084* (2013.01)

(58) Field of Classification Search
CPC ..... B23P 19/084; B23P 19/004; B23P 19/006; B23P 19/02; B23P 19/027; B25B 27/0028; B25B 27/02; B25B 27/026; B25B 27/28; Y10T 29/53657; Y10T 29/53678; Y10T 29/5383; Y10T 29/53987
See application file for complete search history.

(56) References Cited

U.S. PATENT DOCUMENTS

| | | | |
|---|---|---|---|
| 2,840,892 A | 7/1958 | Erdmann | |
| 3,134,168 A | 5/1964 | Erdmann | |
| 3,605,239 A | 9/1971 | Eschholz | |
| 3,808,664 A | 5/1974 | Jaquette | |
| 3,858,237 A | 12/1974 | Sawazaki et al. | |
| 4,212,096 A | 7/1980 | Nagashima et al. | |
| 4,325,172 A | 4/1982 | Holdaway | |
| 4,703,548 A | 11/1987 | Kumeth | |
| 4,848,368 A | 7/1989 | Bondar | |
| 7,757,368 B2 | 7/2010 | Uemura et al. | |
| 2018/0339379 A1* | 11/2018 | Noda | B25J 15/0206 |
| 2020/0368888 A1 | 11/2020 | Cheng et al. | |

FOREIGN PATENT DOCUMENTS

WO WO-2017057181 A1 * 4/2017 ............. B23P 19/04

* cited by examiner

*Primary Examiner* — Eric J Rosen
*Assistant Examiner* — John C Merino
(74) *Attorney, Agent, or Firm* — Scherrer Patent & Trademark Law, P.C.; Stephen T. Scherrer; Monique A. Morneault

(57) ABSTRACT

Automatic seal applicator apparatuses comprise a seal applicator module comprising a conical element and a pair of jaws or fingers that separates a seal, such as an O-ring, a D-ring, or other like seal, from a dispensing sleeve, and automatically applies the same to a part. Moreover, the apparatus comprises a quick-release module for quickly and easily removing one or both the dispensing sleeve and the conical element. In addition, the apparatus comprises a turntable allowing multiple parts to have seals applied thereto automatically. Finally, a system of a plurality of seal applicator apparatuses may be utilized for applying a plurality of seals to parts automatically.

20 Claims, 16 Drawing Sheets

AUTOMATIC SEAL APPLICATOR APPARATUS AND METHODS OF USING THE SAME

CROSS-REFERENCE TO RELATED APPLICATIONS

The present invention claims priority to U.S. Prov. Pat. App. No. 63/237,433, titled "Automatic Seal Applicator Apparatus and Methods of Using the Same," filed Aug. 26, 2021, which is incorporated herein by reference in its entirety.

TECHNICAL FIELD

The present invention relates to an automatic seal applicator apparatus. Specifically, the apparatus comprises a seal applicator module comprising a conical element and a pair of jaws or fingers that individually separates a seal, such as an O-ring, a D-ring, or other like seal, from a dispensing sleeve, and automatically applies the same to a part. Moreover, the apparatus comprises a quick-release module for quickly and easily removing one or both the dispensing sleeve and the conical element. In addition, the apparatus comprises a turntable allowing multiple parts to have seals applied thereto automatically. Finally, a system of a plurality of seal applicator apparatuses may be utilized for applying a plurality of seals to parts automatically.

BACKGROUND

Many mechanical devices include parts that require seals thereon. Oftentimes, these seals are in the form of a ring, whether circular (so-called "O-ring"), in the shape of a "D" (so-called "D-ring") or other like ring-type seals. The parts typically include a circumferential groove within or on the surface of the part, with the seal applied to the circumferential groove so as to remain in place. The part is then typically incorporated into a machine or other mechanical device. A typical part having a seal placed thereon is a piston, for example.

It is often difficult to apply these types of seals to parts. Oftentimes, a seal is applied by hand to the part. Typically, the seal, being typically made from an elastomeric material, is stretched over the part and then released, therefore allowing the seal to constrict and sit within the circumferential groove of the part.

A conical element is oftentimes utilized to stretch the seal in a controlled manner. Typically, the conical element, having a relatively narrow end and a relatively wide end, is disposed with the wide end situated over the part to receive the seal. The worker then moves the seal from the relatively narrow end of the conical element to the relatively wide end thereof until the seal is removed from the conical element, whereupon the seal, if positioned correctly, relaxes, contracts, and sits within the desired circumferential groove.

Apparatuses may also be utilized for applying seals to parts, as opposed to applying the seals by hand. However, the apparatuses often do not effectively grab and move seals easily and efficiently from an applicator dispenser to the part to receive the seal. Specifically, it is often difficult to precisely grab and move a single seal of a plurality of seals and apply the same where desired on the part. A need, therefore, exists for improved seal applicator apparatuses. Specifically, a need exists for improved seal applicator apparatuses that quickly, easily, and efficiently separate and move a single seal of a plurality of stacked seals from an applicator dispenser sleeve. Moreover, a need exists for improved seal application apparatuses that effectively move a single seal from its applicator dispenser to a conical applicator element and to the part, specifically within the desired circumferential groove of the part.

Moreover, typical seal applicator apparatuses only allow for single types of seals to be applied to a part. In addition, typical seal applicator apparatuses only allow for single sizes of seals to be applied to a part. Oftentimes, it is impractical and difficult to change types and/or sizes of seals on an applicator apparatus. As such, different applicator apparatuses are typically utilized for different types and/or sizes of seals. A need, therefore, exists for improved seal applicator apparatuses that allow different types of seals and/or different sizes of seals to be dispensed from the same apparatus. Moreover, a need exists for improved seal applicator apparatuses that allow a user to quickly and easily change a seal dispensing sleeve and/or conical applicator element so that the same apparatuses may dispense different types and sizes of seals.

In addition, typical seal applicator apparatus must still utilize worker manipulation to apply seals to part. As such, seal application is typically slow and difficult, as a worker must be utilized to align the different elements of the module, especially the conical applicator element precisely where desired. A need, therefore, exists for improved seal applicator apparatuses that precisely align the different elements thereof to a part, thereby allowing a seal to be dispensed and applied thereto without extensive manual manipulation.

Further, typical seal applicator apparatuses do not allow a plurality of parts to have seals applied thereto in an automatic manner, such as in an assembly-line like fashion. Oftentimes, individual parts are typically manually placed beneath an apparatus for applying seals thereto. A need, therefore, exists for improved seal applicator apparatuses that automatically feed parts thereto for application of seals, without the need for manual placement of parts thereto.

Still further, typical seal applicator apparatuses are often stand-alone apparatuses, not tied or otherwise coordinated with other seal applicator apparatuses. Thus, typical seal applicator apparatuses cannot be utilized to apply pluralities of seals to respective pluralities of parts at the same time. Likewise, typical seal applicator apparatuses cannot be utilized to apply different types of seals to different parts at the same time. A need, therefore, exists for improved seal applicator apparatuses that allow pluralities of seals to be applied to pluralities of parts at or nearly at the same time. Likewise, a need exists for improved seal applicator apparatuses that allow different types of seals to be applied to different types of parts at or nearly at the same time.

SUMMARY OF THE INVENTION

The present invention relates to an automatic seal applicator apparatus. Specifically, the apparatus comprises a seal applicator module comprising a conical element and a pair of jaws or fingers that individually separates a seal, such as an O-ring, a D-ring, or other like seal, from a dispensing sleeve, and automatically applies the same to a part. Moreover, the apparatus comprises a quick-release module for quickly and easily removing one or both the dispensing sleeve and the conical element. In addition, the apparatus comprises a turntable allowing multiple parts to have seals applied thereto automatically. Finally, a system of a plurality of seal applicator apparatuses may be utilized for applying a plurality of seals to parts automatically.

To this end, in an embodiment of the present invention, a seal applicator apparatus is provided. The seal applicator apparatus comprises: a base module comprising a surface on which a part is configured to be disposed; a seal sleeve above the base module, the seal sleeve configured to hold a plurality of seals thereon; a seal application surface disposed beneath the seal sleeve providing a surface for movement of a seal from the seal sleeve to the part configured to be disposed beneath the seal application surface; and a seal gripper applicator comprising a pair of gripper elements that move inwardly and outwardly in a coordinated manner, wherein the gripper elements each comprise seal contact surfaces wherein the seal contact surfaces engage above the seal on a sleeve and move the seal downwardly over the seal application surface and into a groove on the part configured to be disposed on the base module.

In an embodiment, the base module comprising a turntable and is configured to hold a plurality of parts, each of which is configured to rotate to a position beneath the seal sleeve and the seal application surface.

In an embodiment, the seal sleeve is releasably attached to a shaft.

In an embodiment, the seal sleeve is releasably attached to the shaft via a removable pin.

In an embodiment, the seal sleeve and the seal application surface are movable vertically.

In an embodiment, the seal sleeve and the seal application surface are movable vertically via a motor.

In an embodiment, the seal sleeve and the seal application surface are releasably attached to a shaft.

In an embodiment, the seal sleeve and the seal application surface are attached to a shaft, wherein the shaft is movable vertically via a motor.

In an embodiment, the seal application surface is frustoconical having a first diameter at the top thereof and a second diameter at the bottom thereof, wherein the first diameter is smaller than the second diameter.

In an embodiment, the second diameter at the bottom of the seal application surface is wider than the part configured to be disposed on the base module.

In an embodiment, the seal application surface comprises a shaft and a base, wherein the shaft extends vertically from the base and is attached to a position on the base that is offset from center.

In an embodiment, the seal application surface is releasably attached to a shaft.

In an embodiment, the seal sleeve comprises a rotating cam element having a hook element at a bottom thereof, wherein the rotating cam element is configured to rotate the hook element outside a surface of the seal sleeve to hold a seal thereon and further to rotate the hook element inside the surface of the seal sleeve to release the seal thereon.

In an embodiment, the rotating cam element comprises a shoulder, wherein the rotating cam element is configured to rotate the shoulder outside a surface of the sleeve to hold a second seal when the hook element is rotated inside the surface of the seal sleeve, and to further rotate the shoulder inside the surface of the seal sleeve when the hook element is rotated outside the surface of the seal sleeve.

In an embodiment, each of the seal contact surfaces comprises an arcuate surface for engaging a seal on the seal sleeve and pushing the seal down the seal application surface to the part thereunder.

In an embodiment, each of the seal contact surfaces comprises at least one fixed contact point and at least one expandable contact point.

In an embodiment, the at least one expandable contact point may comprise a spring allowing the expandable contact point to expand when the seal gripper applicator moves the seal down the seal application surface.

In an embodiment, the seal gripper applicator is movable vertically via a motor.

In an embodiment, the pair of gripper elements move inwardly and outwardly in a coordinated manner via a motor.

In an alternate embodiment of the present invention, a system for applying seals to parts is provided. The system comprises: a first seal applicator apparatus; and a second seal applicator apparatus comprising: a second seal sleeve above the base module, the second seal sleeve configured to hold a second plurality of seals thereon; a second seal application surface disposed beneath the second seal sleeve providing a surface for movement of a seal from the seal sleeve to the part or a second part; and a second seal gripper applicator for moving a second seal from the second seal sleeve down the second seal application surface.

It is, therefore, an advantage and objective of the present invention to provide improved seal applicator apparatuses.

Specifically, it is an advantage and objective of the present invention to provide improved seal applicator apparatuses that quickly, easily, and efficiently separate and move a single seal of a plurality of stacked seals from an applicator dispenser.

Moreover, it is an advantage and objective of the present invention to provide improved seal application apparatuses that effectively move a single seal from its applicator dispenser to a conical applicator element and to the part, specifically within the desired circumferential groove of the part.

Further, it is an advantage and objective of the present invention to provide improved seal applicator apparatuses that allow different types of seals and/or different sizes of seals to be dispensed from the same apparatus.

Still further, it is an advantage and objective of the present invention to provide improved seal applicator apparatuses that allow a user to quickly and easily change a seal dispensing sleeve and/or conical applicator element so that the same apparatuses may dispense different types and sizes of seals.

In addition, it is an advantage and objective of the present invention to provide improved seal applicator apparatuses that precisely align the different elements thereof to a part, thereby allowing a seal to be dispensed and applied thereto without extensive manual manipulation.

Moreover, it is an advantage and objective of the present invention to provide improved seal applicator apparatuses that automatically feed parts thereto for application of seals, without the need for manual placement of parts thereto.

In addition, it is an advantage and objective of the present invention to provide improved seal applicator apparatuses that allow pluralities of seals to be applied to pluralities of parts at or nearly at the same time.

Likewise, it is an advantage and objective of the present invention to provide improved seal applicator apparatuses that allow different types of seals to be applied to different types of parts at or nearly at the same time.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to an automatic seal applicator apparatus. Specifically, the apparatus comprises a seal applicator module comprising a conical element and a pair of jaws or fingers that individually separates a seal, such as an O-ring, a D-ring, or other like seal, from a dispensing sleeve, and automatically applies the same to a part. Moreover, the apparatus comprises a quick-release module for quickly and easily removing one or both the dispensing sleeve and the conical element. In addition, the apparatus comprises a turntable allowing multiple parts to have seals applied thereto automatically. Finally, a system of a plurality of seal applicator apparatuses may be utilized for applying a plurality of seals to parts automatically.

Figure 1:
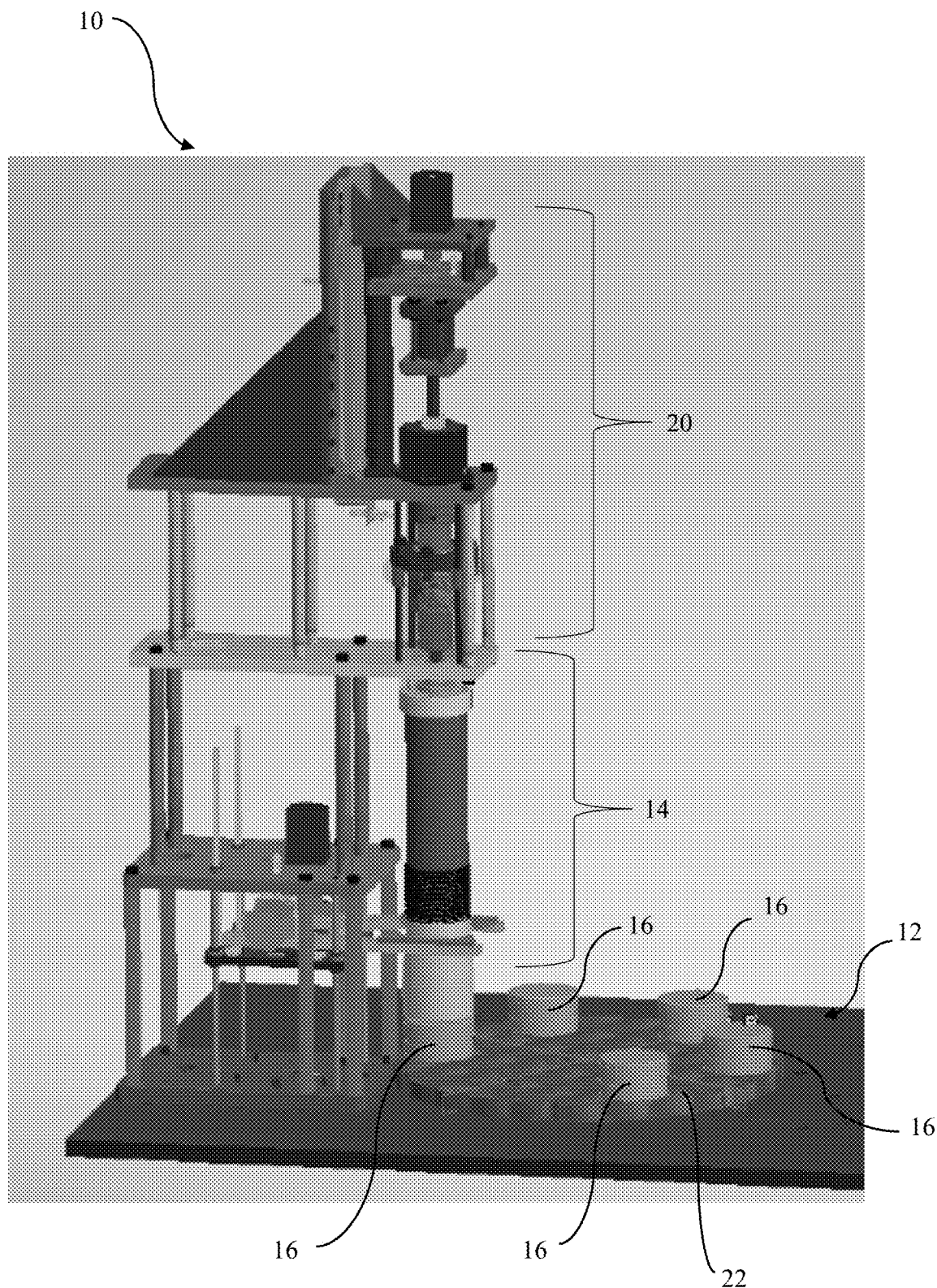
FIG. 1 illustrates a perspective view of a seal applicator apparatus in an embodiment of the present invention.
Figure 2:
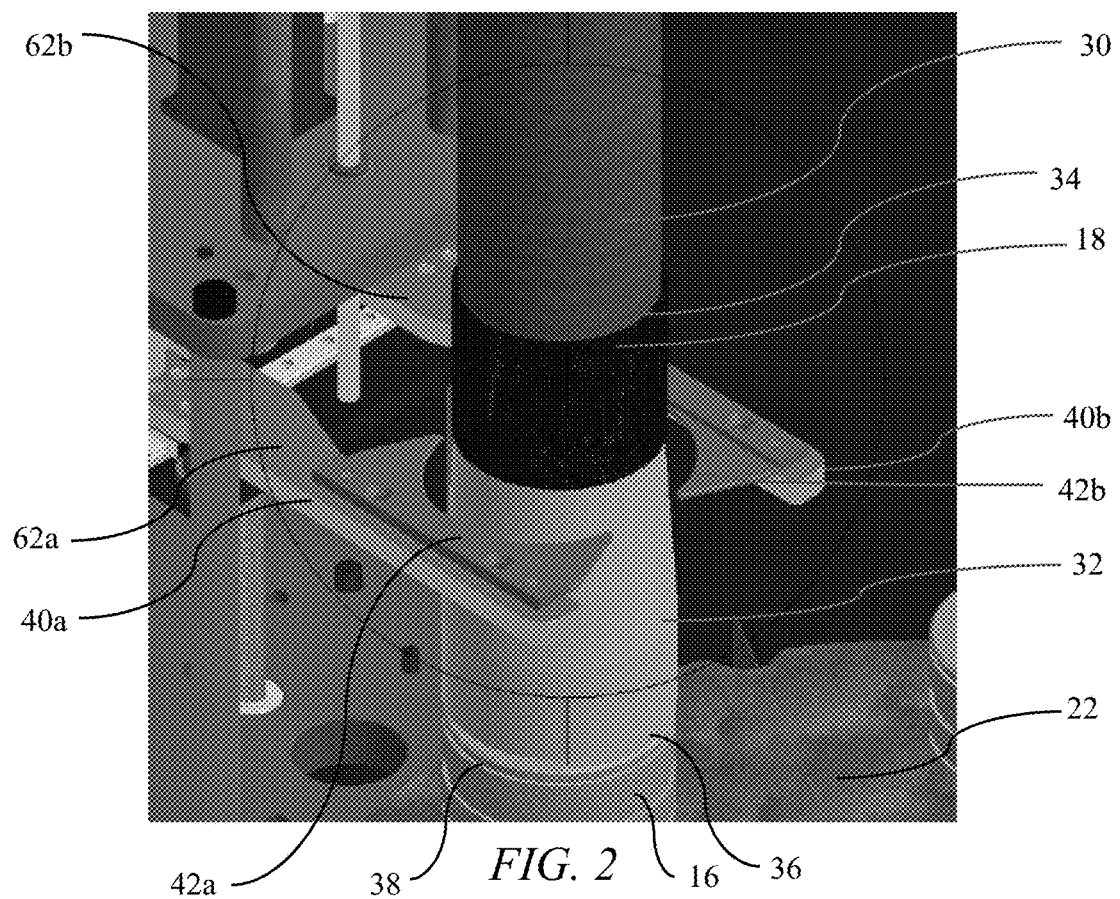
FIG. 2 illustrates a close-up view of a seal gripper/applicator module in an embodiment of the present invention.

Referring now to the figures, FIG. 1 illustrates a perspective view of an automatic seal applicator apparatus 10 in an embodiment of the present invention. The apparatus 10 comprises three main modules: 1) a base module 12 comprising a surface on which parts may be disposed whereupon seals may be applied to the parts; 2) a seal gripper/applicator module 14 where seals may be moved to a part and applied thereto; and 3) a quick-change module 20 from which a sleeve of seals and/or an applicator cone may be easily and quickly removed and changed, as needed.

The base module 12 may comprise a surface on which parts 16 may be disposed, whereupon the parts 16 may have one or more seals 18 applied thereto in desired locations. The parts are typically machined elements for use in industrial machinery. For example, the part 16 may be a piston or the like, having at least one location requiring a circumferential seal, such an O-ring, for example, applied thereto.

Typically, the parts 16 comprise circumferential grooves 38 and the seals 18 may be applied within the grooves 38. There may be one or a plurality of grooves 38 to which seals 18 may be applied, and the present invention provides application of the seals 18 to each of the grooves 38, as needed. The seals 18 may typically be O-rings, but may be other shapes as well, including square-shaped, rectangular, "T", D-rings, and other like ring-type seals, as well as any other type of seal apparent to one of ordinary skill in the art.

As illustrated in FIG. 1, the base module 12 may comprise a turntable 22 on which the parts 16 may sit in specific positions or stations. Specifically, multiple parts 16 may be placed and held in suitable positions or stations on the turntable 22, which may then rotate to the seal gripper/applicator module 14 for application of one or more seals thereto. Although FIG. 1 illustrates that the base module 12 may be a turntable 22, it should be noted that any other type of surface may also be used, such as, for example, a conveyor system or other like moving system for moving parts 16 to and away from the gripper/application module 14. Moreover, the turntable 22 may further comprise means for centering parts in alignment at each position or station so that the part is in perfect position when a seal 18 is applied thereto, as described below. For example, each position or station on the turntable 22 may comprise a centering ring (not shown) to keep different sized parts in alignment.

The seal gripper/applicator module 14 may generally comprise a sleeve 30 having a plurality of seals 18 disposed thereon stacked one upon another awaiting application to a groove 38 within a part 16, as illustrated in FIGS. 2-5. Mounted below the sleeve 30 may be an applicator cone 32. The applicator cone 32 may generally have a first diameter at a top 34 thereof for generally matching a diameter of the sleeve 30 and a second larger diameter at a bottom 36 thereof for allowing a seal 18 to be applied to a groove 38 of a part 16. Therefore, the cone 32 may have a frustoconical shape such that when a seal 18 slides down the outer surface of the cone 32, it expands in size so that it has a diameter larger than the part 16 to which it is to be applied. Thus, when the seal 18 slides off the bottom 36 of the cone 32, it retracts to fit snugly within the groove 38 on the part 16.

Figure 3:
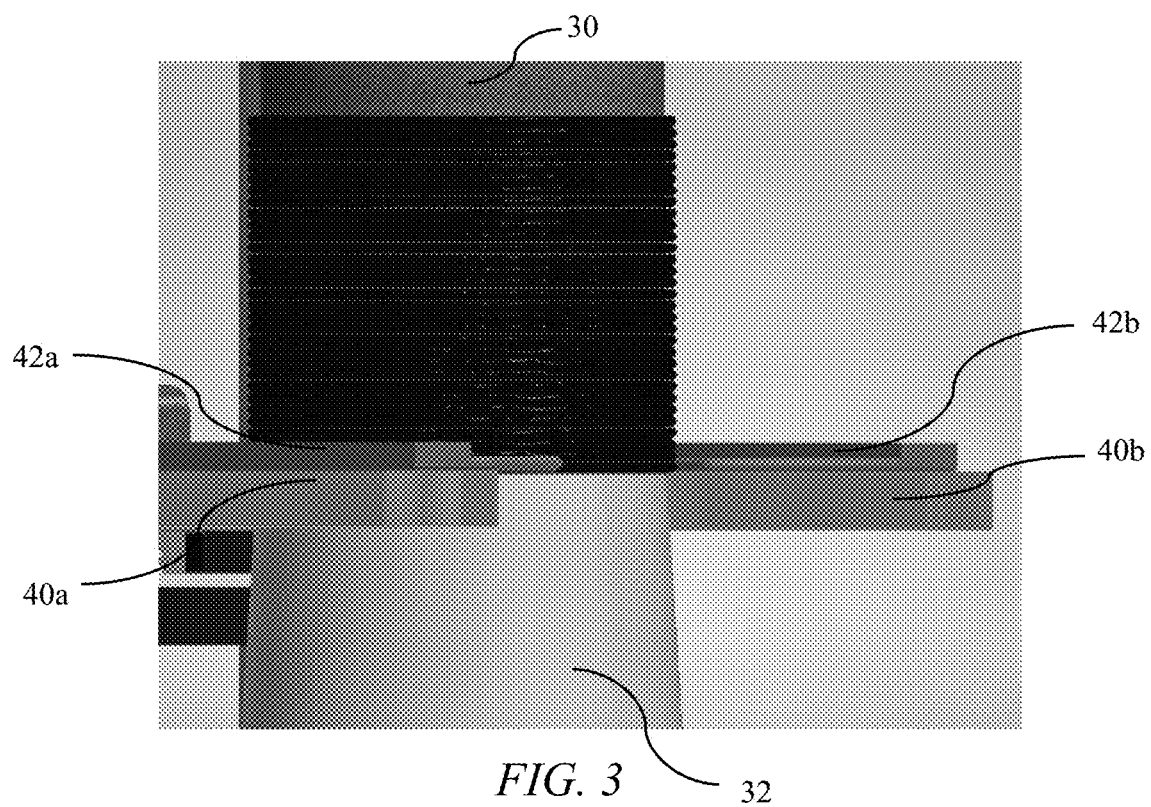
FIG. 3 illustrates a side close-up view of a seal gripper/applicator module in an embodiment of the present invention.
Figure 4:
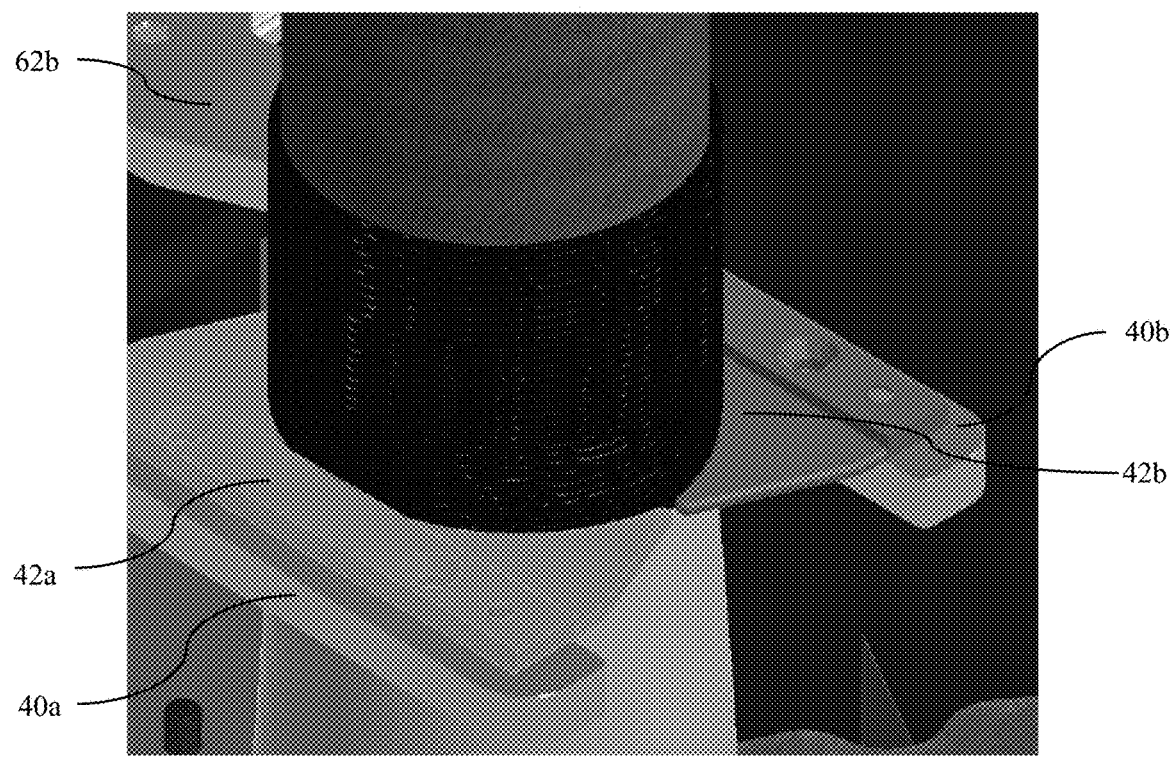
FIG. 4 illustrates a close-up view of a seal gripper/applicator module separating a seal from other seals in an embodiment of the present invention.
Figure 5:
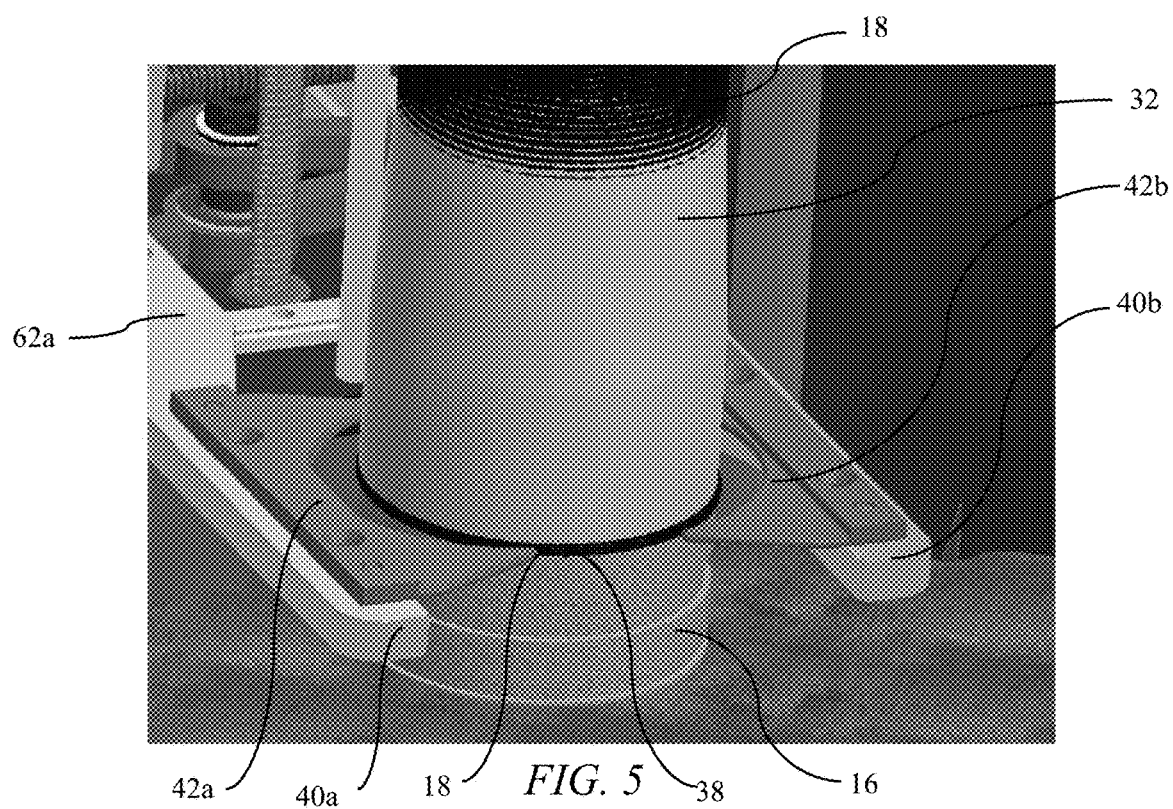
FIG. 5 illustrates a close-up view of a seal gripper/applicator module having moved a seal to a groove on a part over a cone surface in an embodiment of the present invention.

To separate the seals 18 from one another and to move the seals 18 from the sleeve 30 to the cone 32, and ultimately to the groove 38 within the part 16, a pair of gripper elements 40a, 40b may be utilized. The gripper elements 40a, 40b may comprise seal contact surface elements 42a, 42b, respectively, that may be utilized to contact above the seal 18 and between the seal 18 and an adjacent seal, thereby separating the seal 18 from the adjacent seal, as illustrated in FIGS. 3-4. The gripper elements 40a, 40b may then traverse downwardly pushing the separated seal 18 off the sleeve 30 and onto the cone 32, and then off of the bottom 36 of the cone 32 so that the separated seal 18 retracts into a groove 38 on the part 16, as illustrated in FIG. 5.

The seal contact surface elements 42a, 42b may comprise soft, flexible yet resilient material, such as a thermoplastic polyurethane (TPU), for example, or other like material. Therefore, because the seal contact surface elements 42a, 42b are flexible, they may allow multiple points of contact on the seal as it travels down the cone 32, especially as the cone's diameter increases in size as the seal 18 travels downwardly over the surface of the cone 32. The present invention should not be limited as described herein and may include other elements or materials. For example, the seal contact surface elements 42a, 42b may be made of other materials, such as aluminum with 3D printed material, such as a TPU or polylactic acid (PLA) contact surface. Moreover, other embodiments may include spring-loaded jaws within the gripper elements 40a, 40b, for example.

Figure 14:
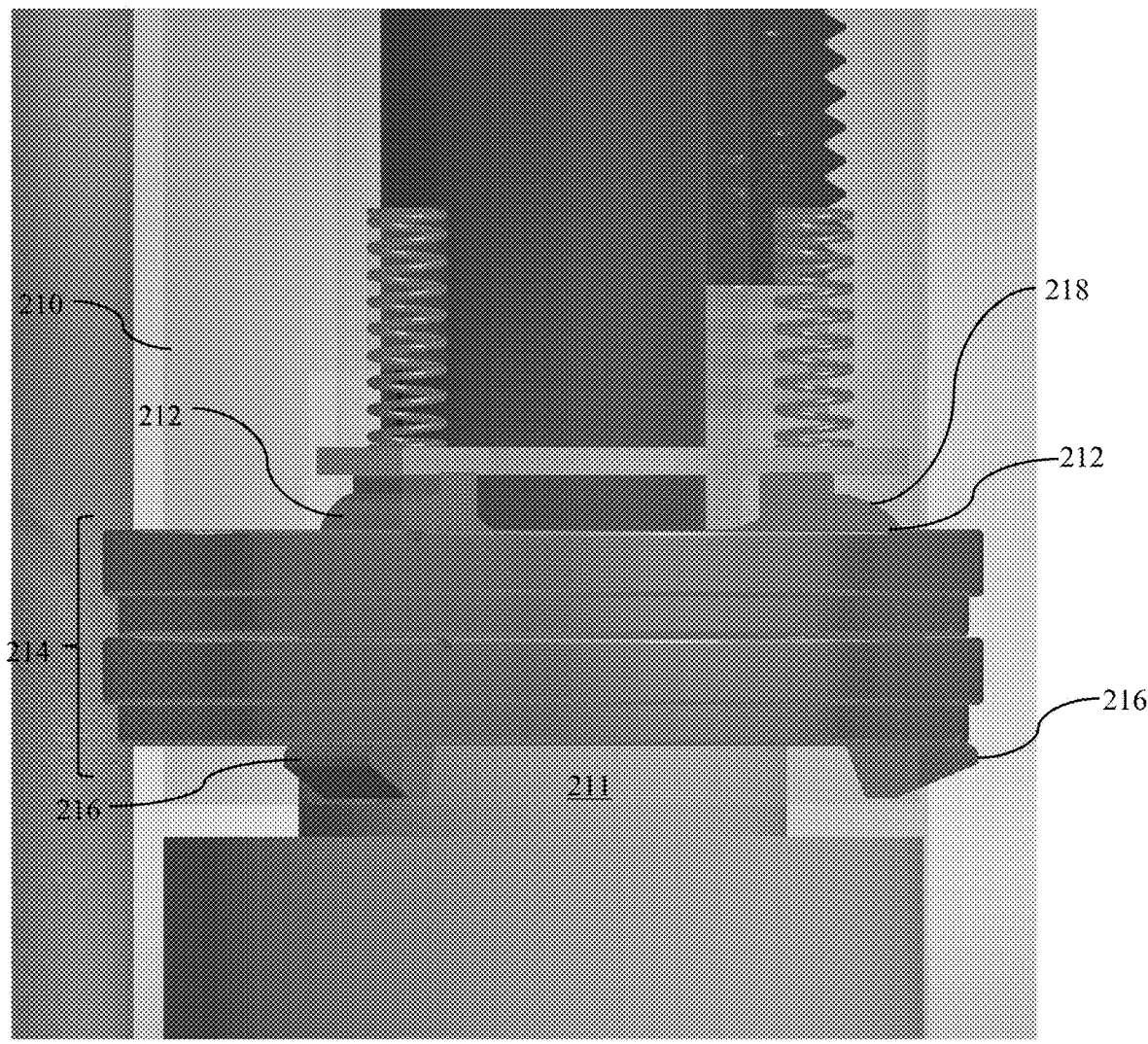
FIG. 14 illustrates a cut-away close-up view of a seal sleeve and application cone in an embodiment of the present invention.
Figure 15:
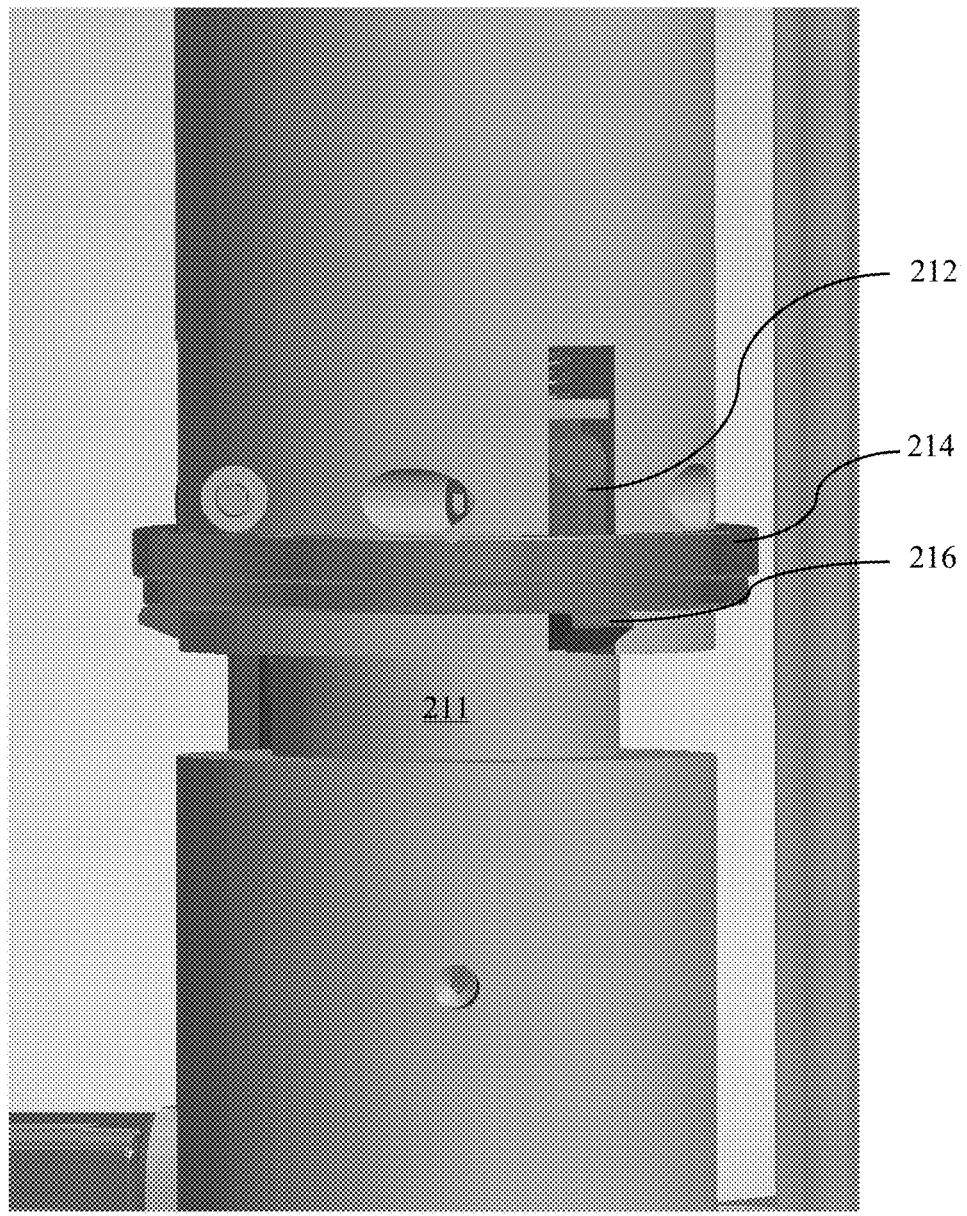
FIG. 15 illustrates a close-up view of a seal sleeve and application cone having a protruding hub in an embodiment of the present invention.
Figure 16:
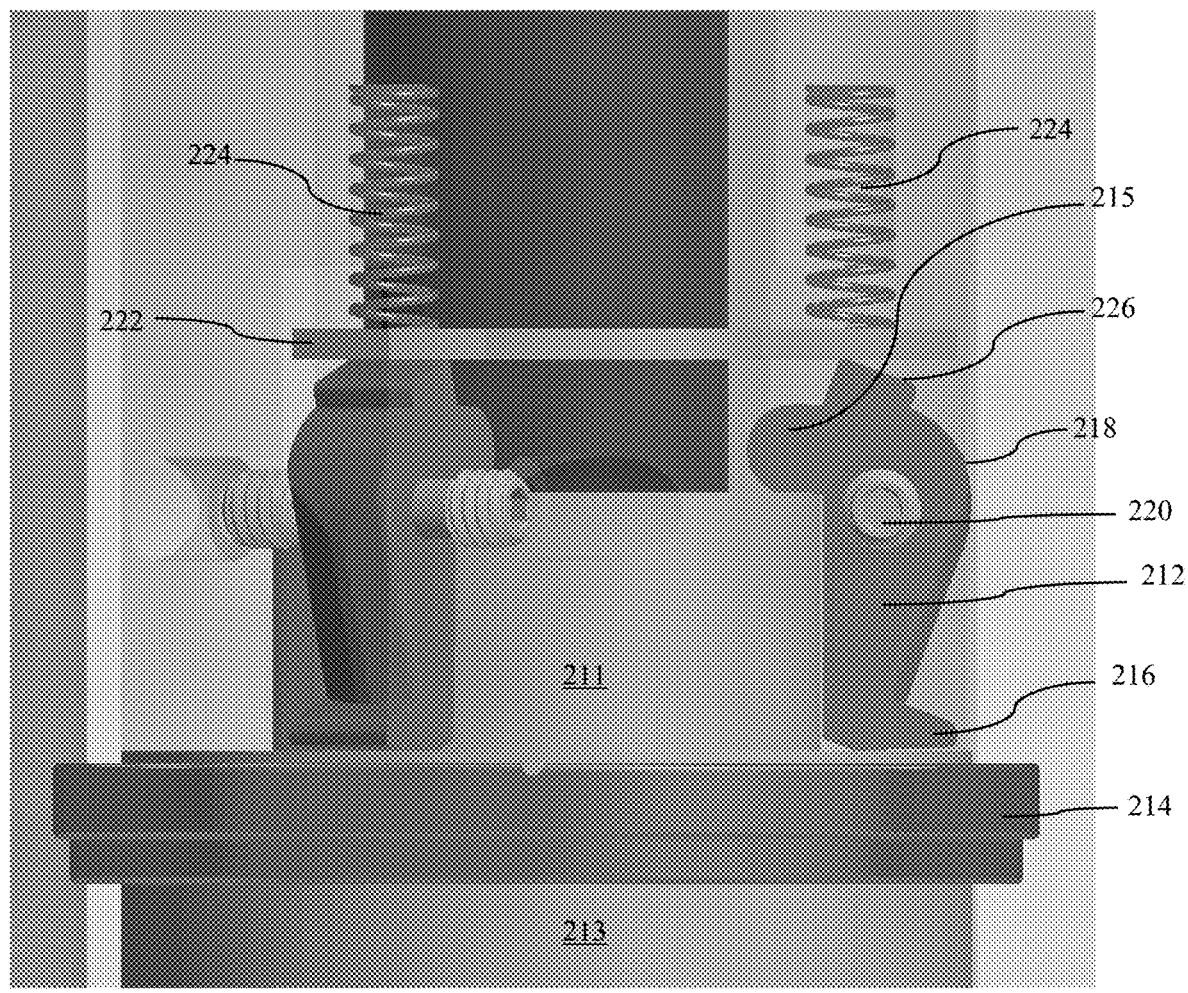
FIG. 16 illustrates a cut-away close-up view of a seal sleeve and application cone, including an internal seal application mechanism, in an embodiment of the present invention.

Certain seals, such as rectangular seals, may be difficult to separate cleanly using the gripper elements 40a, 40b and the seal contact surface elements 42a, 42b, as described above, so a "seal index system" may be used to better separate seals from each other. The seal index system, as illustrated in FIGS. 14-16 and described in more detail below, may utilize the top of the cone to "bump" the bottom of the seal sleeve. This interaction may then force one seal to separate from the others, dropping it in clear position for the gripper elements 40a, 40b and the seal contact surface elements 42a, 42b to contact and push.

In addition, a lubricant sprayer (not shown) may be incorporated into the apparatus 10 for spraying lubricant onto the seals 18, the sleeve 30, and/or the surface of the cone 32. The lubricant may more easily allow separation of the seals 18 from each other and may further allow for the travel of the seal 18 down the sleeve 30 and/or cone 32 and onto the part 16.

Because different sized and types of seals may be applied to parts, according to the present invention, the cone may be interchangeable with other differently sized or shaped cones, as needed. Moreover, the sleeve 30 of seals 18 may also be interchanged as necessary to change the types and sizes of seals to be applied, or when seals run out. The quick-change module 20, as described below, provides an example of how the sleeve 30 and/or cone 32 may be quickly and easily changed to accommodate different sizes and shapes of seals.

Figure 6A:
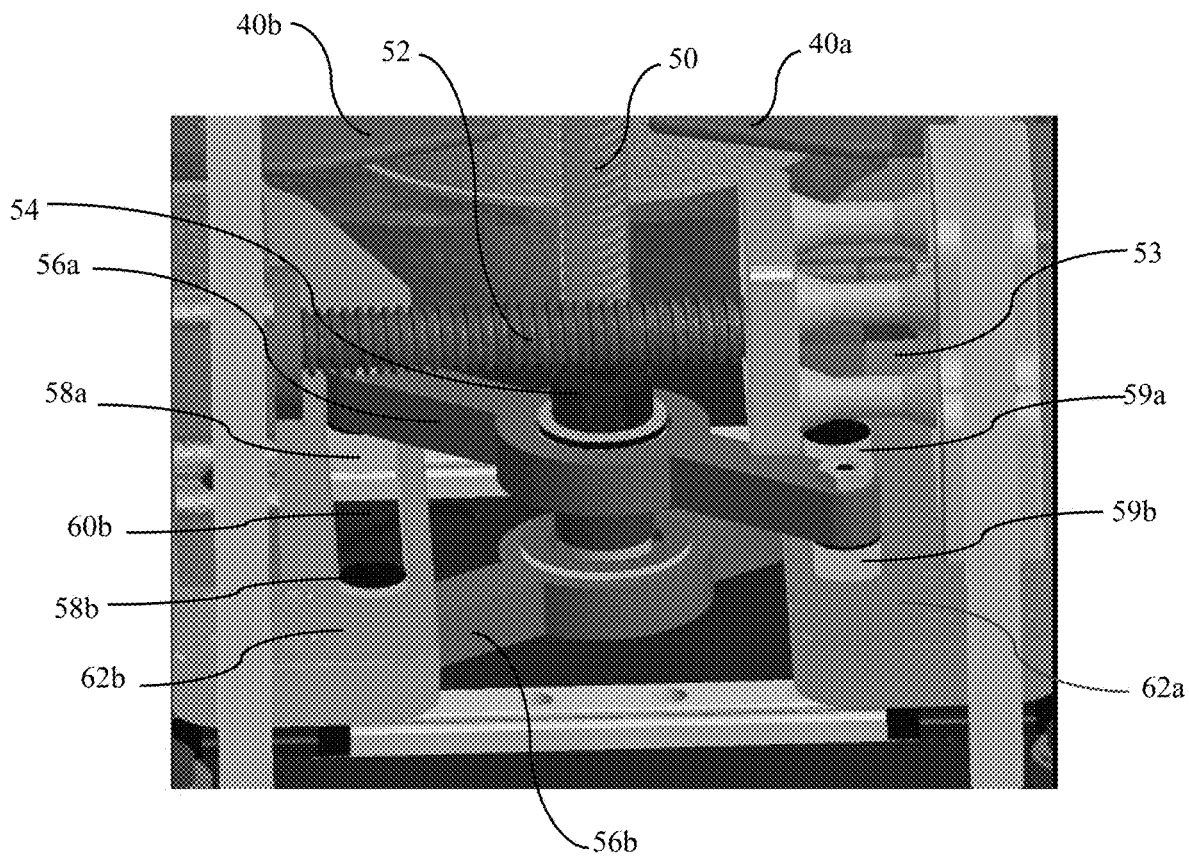
FIGS. 6A-6B illustrate a close-up internal view of a seal gripper/applicator module in an embodiment of the present invention.
Figure 6B:
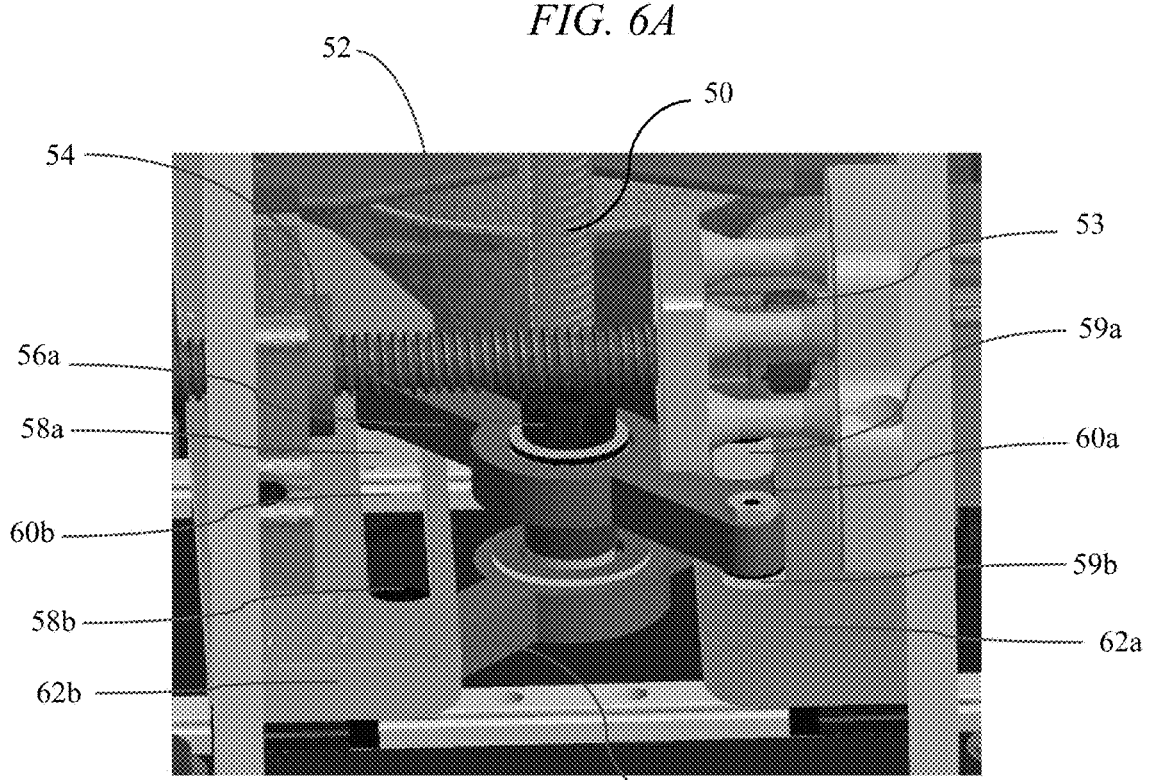

FIGS. 6A-6B illustrate an internal view of exemplary parts that allow the gripper elements 40a, 40b to move inwardly and outwardly in a coordinated manner to separate and move a seal 18, as described above, as well as the vertical movement of the gripper elements 40a, 40b upwardly and downwardly. In an exemplary embodiment, ACME screw 50 may be controlled by a motor, such as a servo/stepper motor, thereby moving a platform from which the gripper elements 40a, 40b extend, thereby moving the gripper elements 40a, 40b upwardly and downwardly. A controller (not shown) may control the motor for precise placement of the gripper elements 40a, 40b.

In an exemplary embodiment, ACME screw 52 may be driven by a servo/stepper motor (not shown), thereby applying extension/retraction pressure to arms 62a, 62b, thereby moving gripper elements 40a, 40b, respectively, both inwardly (toward each other) and outwardly (away from each other), based on the direction of the turn of the ACME screw 52. The cross arms 62a, 62b may be constrained by central shaft 54 causing concentric movement of cross arms 56a, 56b. Moreover, the extension or retraction of the arms 62a, 62b may apply pressure to cam rollers 58a, 58b and 59a, 59b within slots 60a, 60b, respectively, thereby moving arms 62a, 62b inwardly and outwardly, depending on the rotation of the ACME screw 52.

Movement of the arms 62a, 62b is illustrated by FIGS. 6A and 6B. FIG. 6A illustrates arms 62a, 62b relatively apart from each other and, therefore, gripper elements 42a, 42b apart from each other. As ACME screw 52 rotates, cross arms 62a, 62b, constrained by central shaft 54, move concentrically toward each other. The constraint of cam rollers 58a, 58b and 59a, 59b within slots 60a, 60b causes arms 62a, 62b to move toward each other, as illustrated in FIG. 6B, thus moving gripper elements 40a, 40b and, ultimately, seal contact surface elements 42a, 42b inwardly toward each other as well to separate and move a seal downwardly from the sleeve 30 to the cone 32 and, ultimately, to the groove 38 within the part 16 via the ACME screw 50, as described above.

Figure 7:
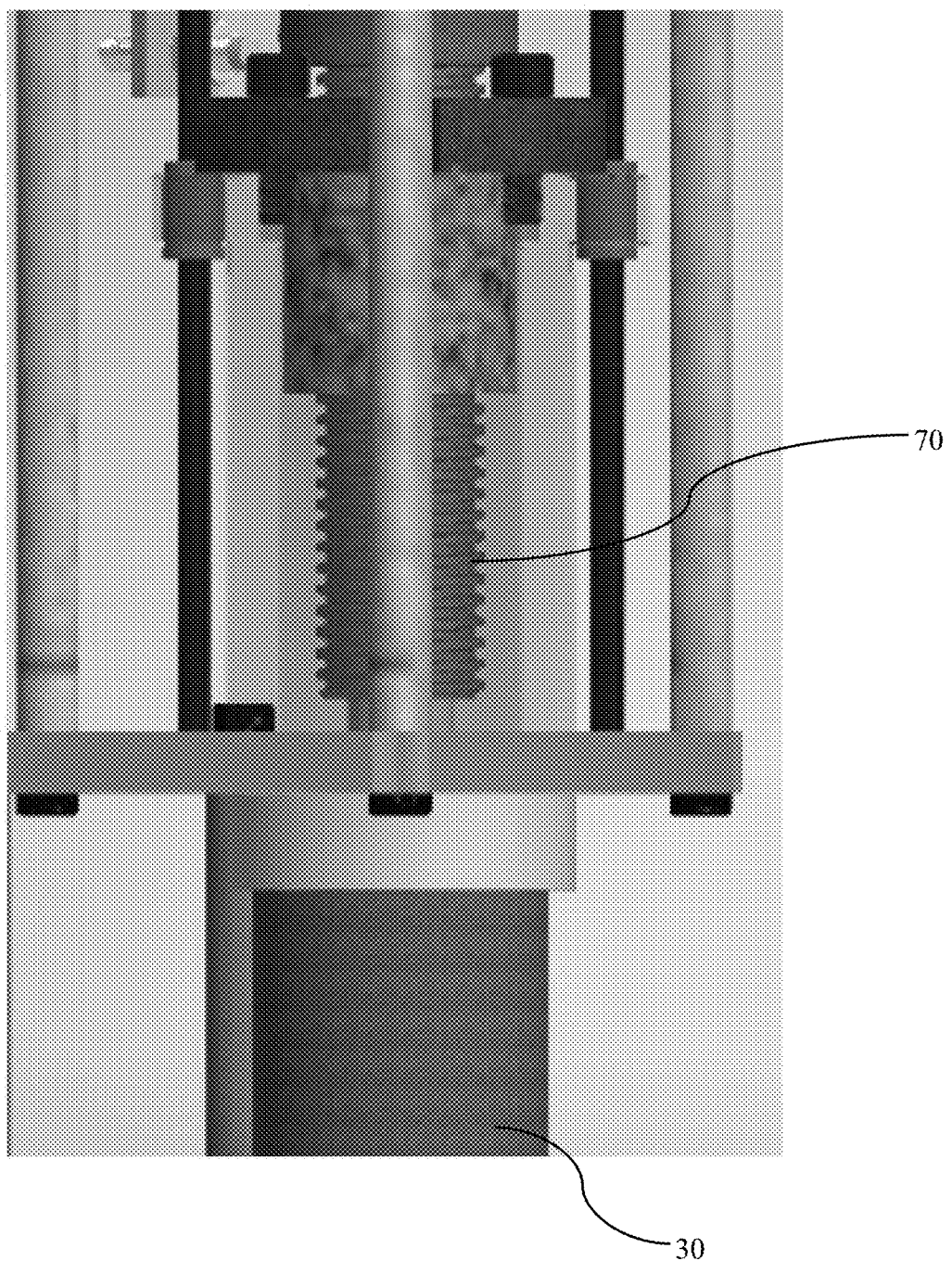
FIG. 7 illustrates a close-up view of an O-ring sleeve drive screw in an embodiment of the present invention.

The sleeve 30 and the cone 32 may each also move vertically so as to position the cone 32 properly over a part 16 for application of a seal 18 from sleeve 30 thereto. In a preferred embodiment, the sleeve 30 may move independently from the cone so that each may be independently removed and replaced as needed. As illustrated in FIG. 7, the sleeve 30 may move vertically via rotation of sleeve drive screw 70 driven by servo/stepper motor 72, which may be positioned above the sleeve 30. Thus, the motor 72 rotating the sleeve drive screw 70 may raise and/or lower the sleeve 30 into a desired position.

Figure 8:
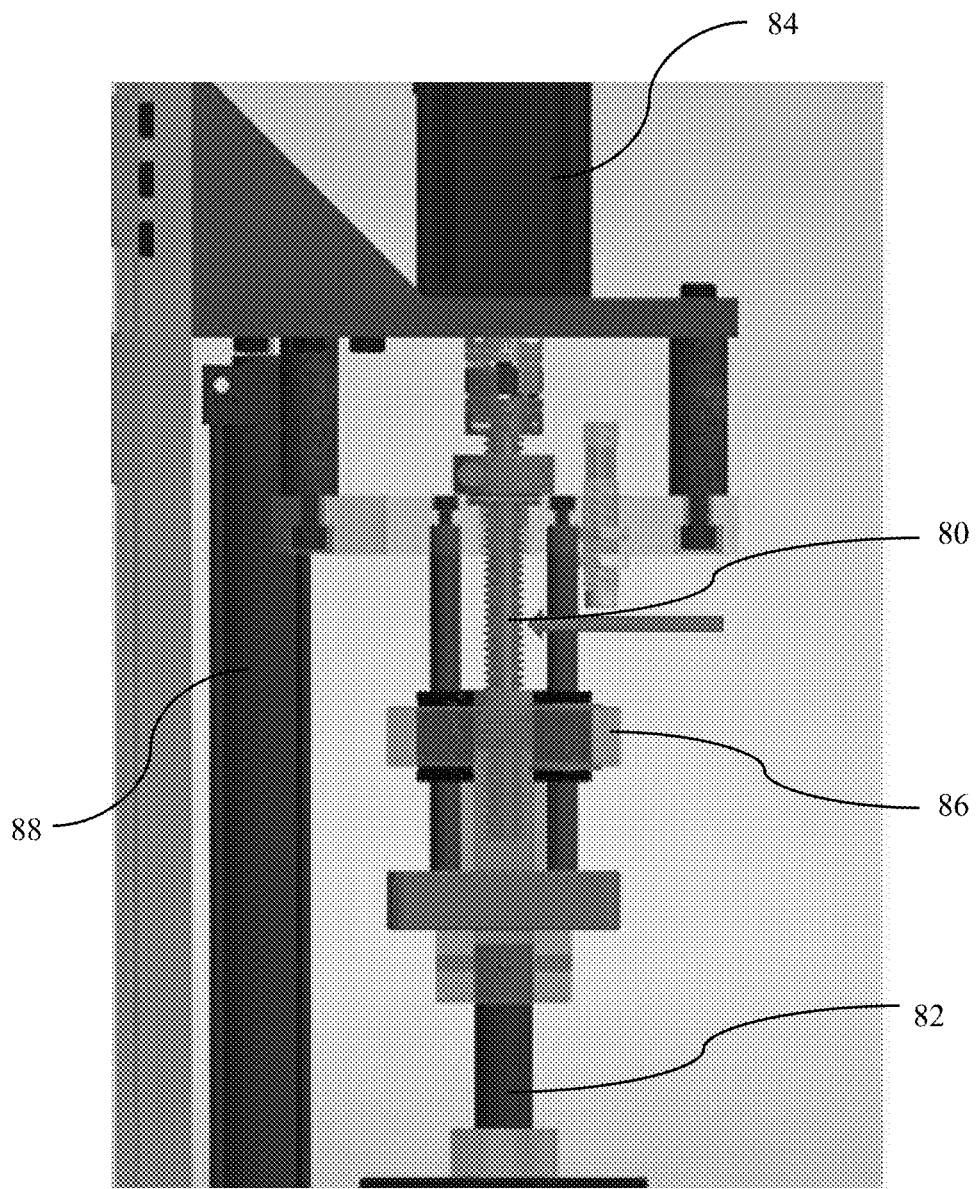
FIG. 8 illustrates a side view of a cone drive screw and shaft for raising and lowering a cone in an embodiment of the present invention.

The cone 32 may move upwardly and downwardly independently of the sleeve 30, as illustrated in FIG. 8. Specifically, the cone 32 may be connected to a shaft 82 that is connected to a screw 80 via a carriage 86 that is driven by a servo/stepper motor 84. As the motor 84 rotates the screw 80, the carriage 86 thereby moves the shaft 82, providing fine movement of the cone 32 at an end of the shaft 82. Thus, the screw 80, rotated by the servo/stepper motor 84, may cause the shaft 82 and, thus, the cone 32 to raise and lower as desired. The shaft 82 may extend through the motor 72, which may have a hollow passage therein, providing clearance for the shaft 82 to extend therethrough.

Figure 9:
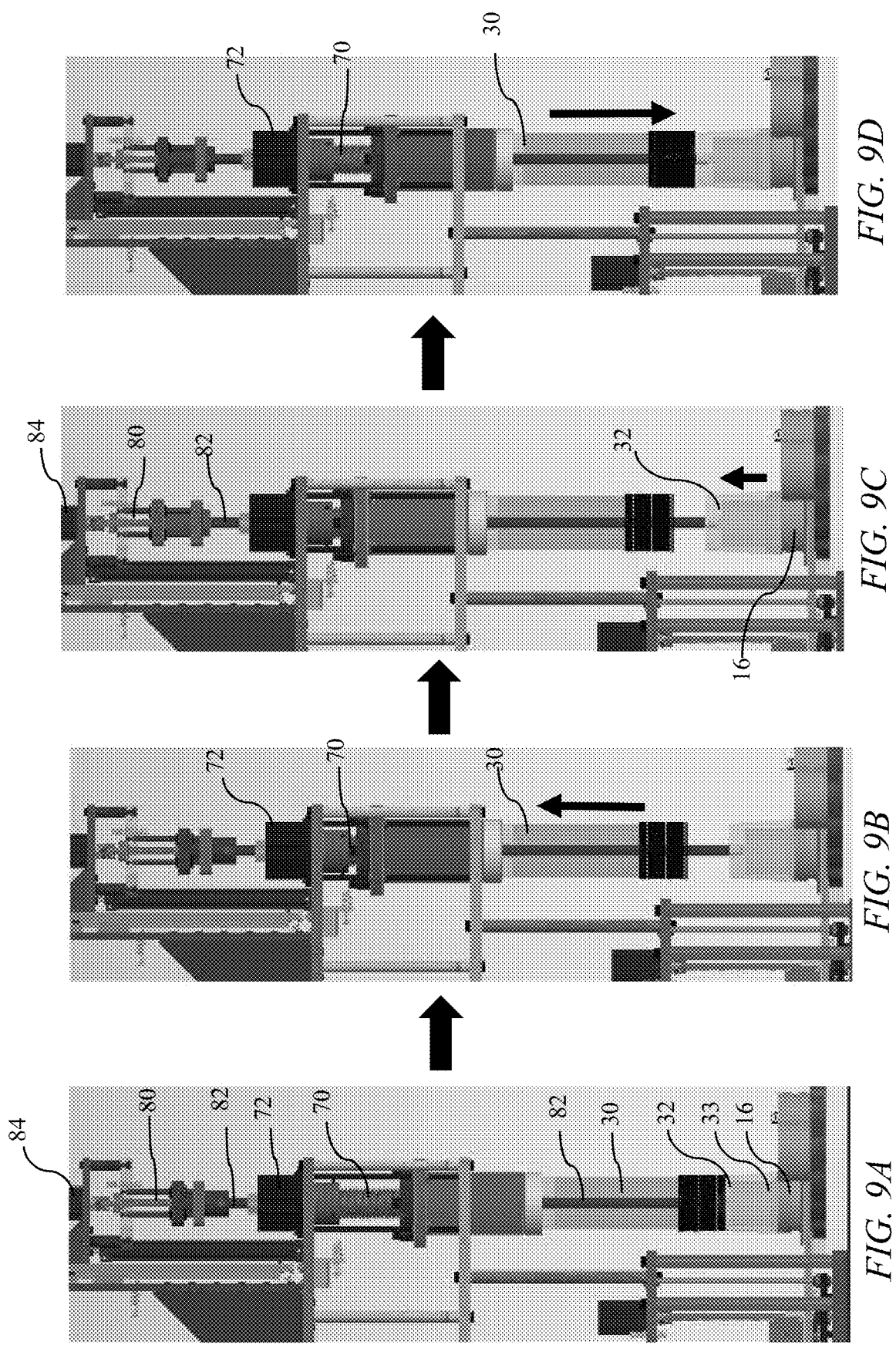
FIGS. 9A-9D illustrate relative movements of a sleeve and cone of an apparatus in an embodiment of the present invention.

Moreover, the cone 32 may have an opening and/or space 33 therein on a bottom allowing the cone 32 to be placed over the part 16 and lowered to reach grooves 38 that may be placed in lower positions on the part 16, as illustrated in FIG. 9A.

FIGS. 9A-9D illustrate the relative independent movements of the sleeve 30 and cone 32 in an exemplary embodiment of the present invention. For example, as shown in FIG. 9A, the cone 32 and the sleeve 30 may be in position over a part 16 for placement of a seal thereon using the gripper elements 40a, 40b as shown and described above, not shown in FIGS. 9A-9D. Once placed, the motor 72 may rotate the screw 70, thereby raising the sleeve 30 upwardly, as illustrated in FIG. 9B. The motor 84 may then rotate the screw 80, thereby raising the shaft 82 and, thus, the cone 32 to a position. As illustrated in FIG. 9C, the cone 32 may be positioned on the part 16 for placement of another seal in another location thereon. However, it should be noted that the cone 32 may be raised completely over the part 16 to allow for movement of parts therebeneath, such as to place a different part 16 thereunder for placement of seals thereon. After the cone 32 is raised to the desired position using the motor 84, the motor 72 may lower the sleeve 30 onto or otherwise immediately adjacent the cone 32 so that a seal can be separated and moved to the part thereunder.

Different seal types may require different applications. For example, as noted above, rectangular seals may not separate cleanly from groups of seals on the sleeves. Moreover, a large cross-section seal may not stretch easily over a conical applicator device. In addition, a small cross-section seal may not travel evenly down a cone without multiple contact points acting upon the seal. FIGS. 12-20 illustrate various embodiments for allowing different seal types to be separated and moved onto a part thereunder.

Figure 12:
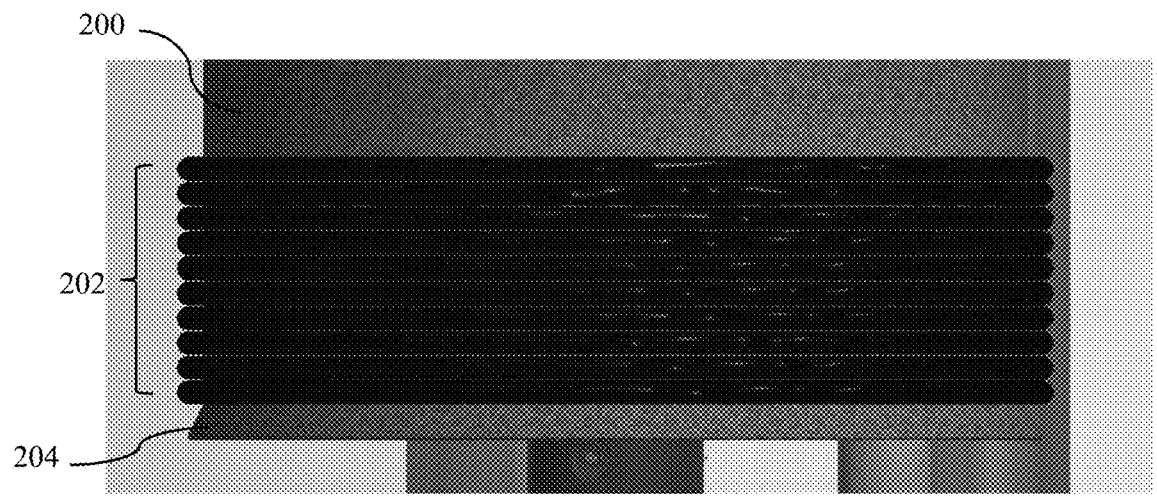
FIG. 12 illustrates a close-up view of a seal sleeve in an embodiment of the present invention.
Figure 13:
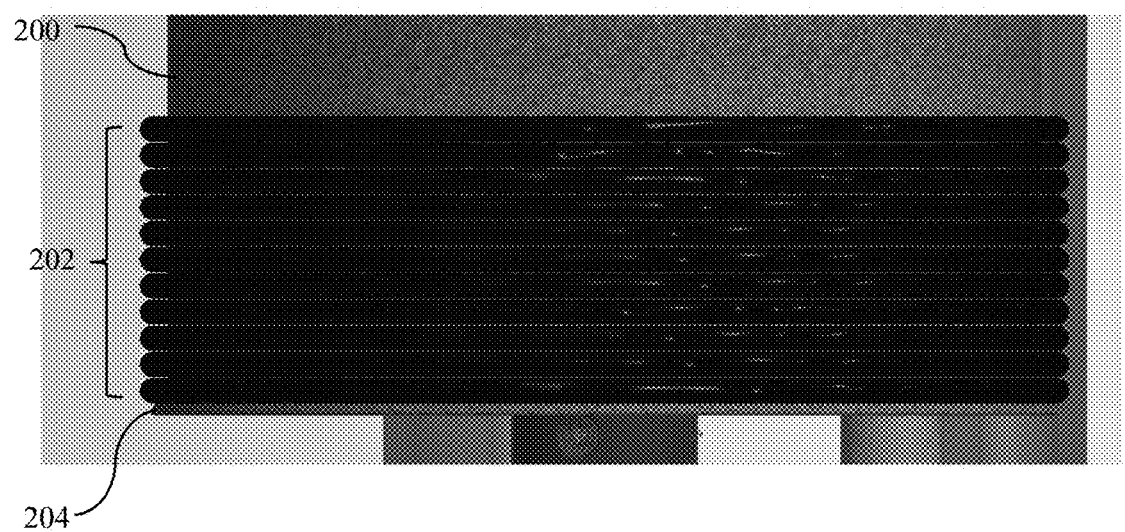
FIG. 13 illustrates a close-up view of a seal sleeve in an embodiment of the present invention.

Specifically, FIGS. 12-13 illustrate an apparatus and method for maintaining seals on the seal sleeve and preventing movement of the seals to the cone for application thereof. Specifically, a seal sleeve 200 having a plurality of seals 202 may have a lip 204 on a bottom thereof for maintaining the seals on the sleeve until one is desired to be separated and moved to the cone for application to the part. As illustrated in FIG. 13, the seals 202 are maintained on the sleeve and blocked from moving to the cone due to the lip 204 until an individual seal separator is used to move one seal off of the sleeve onto the cone for application to the part thereunder. This may be utilized for any seal type that may be easily separate from the remaining seals on the seal sleeve 200 and that easily stretch over the seal sleeve lip 204. Seals that do not meet these parameters may require an alternate apparatus and method to retain seals on the sleeves under normal conditions but release 1 seal at a time when required for seal installation.

FIGS. 14-16 illustrate another apparatus and method for retaining seals on sleeves and moving and releasing one seal at a time for seal install, especially for seals that may not be easily separated from each other and/or may not easily stretch over seal sleeve lip 204, as described above. Specifically, FIG. 14 illustrates a sleeve 210 comprising a plurality of eccentric hooks 212 that may rotate inwardly and outwardly as illustrated in FIG. 16. A plurality of seals 214 may be disposed on the sleeve 210 and a hook element 216 on each eccentric hook 212 may hold the seals in place on the sleeve until one is required for application on a part thereunder. A protruding hub 211 may extend from an application cone 213, acting on a protrusion 215 extending from the eccentric hook 212. The eccentric hook 212 may then pivot on axis 220, causing the hook element 216 to move inwardly releasing the seal from the hook element. At the same time, a curved cam-like arced shoulder 218 may pivot outwardly past the diameter of the sleeve 210 putting pressure and thereby holding an adjacent seal or seals in place while the lowermost seal is released, as shown in FIG. 16. As the sleeve travels upwardly away from the cone 213, the protruding hub 211 may release the protrusion 215 and a plate 222, which may be biased by springs 224 may push downwardly upon tabs 226 on the eccentric hooks 212, forcing the eccentric hooks 212 back into resting position, releasing the lowermost seal, and retaining the next adjacent seal.

Figure 17:
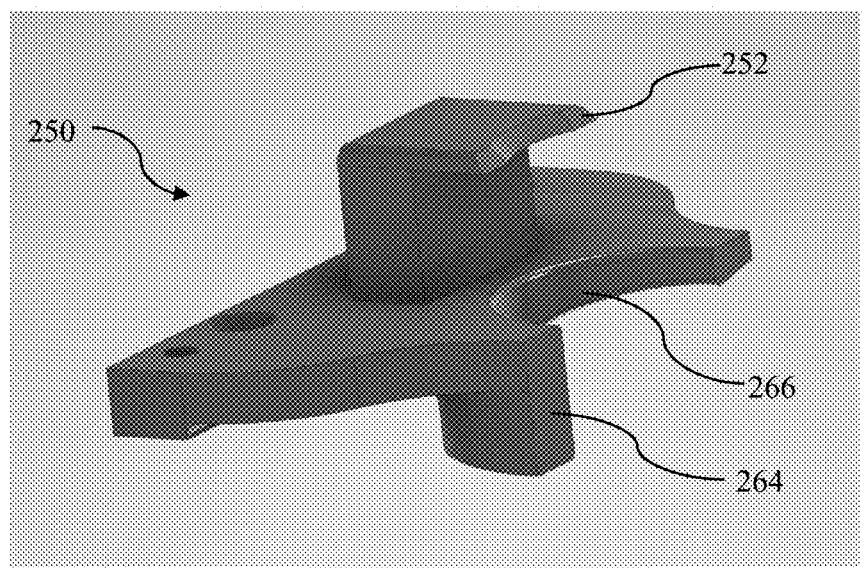
FIG. 17 illustrates a perspective view of a seal jaw in an embodiment of the present invention.
Figure 18:
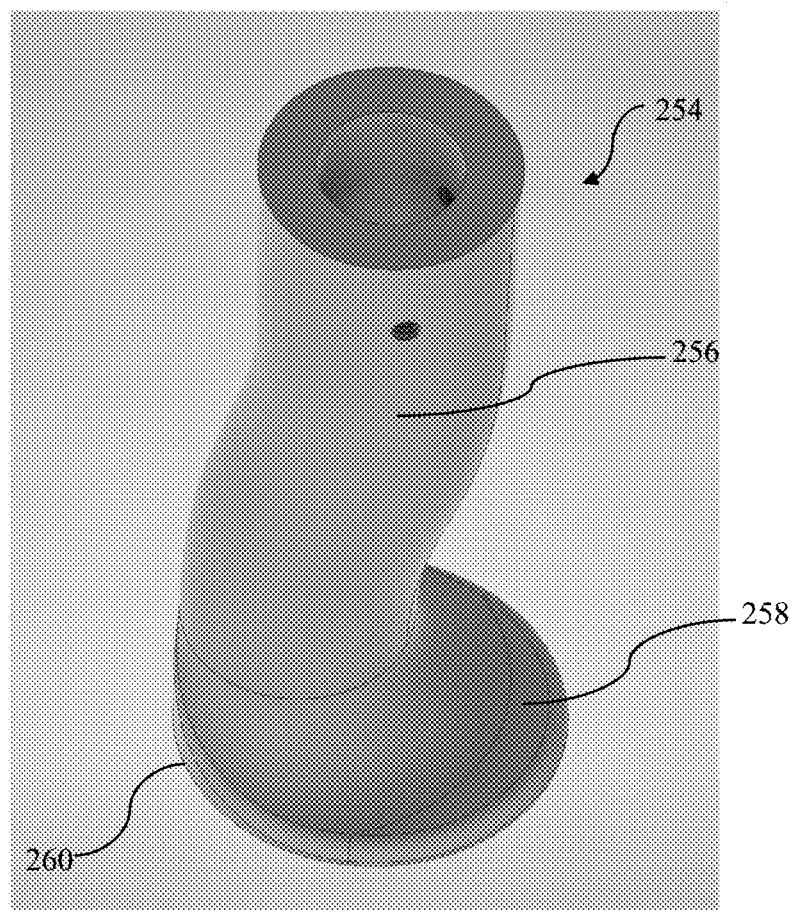
FIG. 18 illustrates a perspective view of an offset application cone in an embodiment of the present invention.
Figure 19:
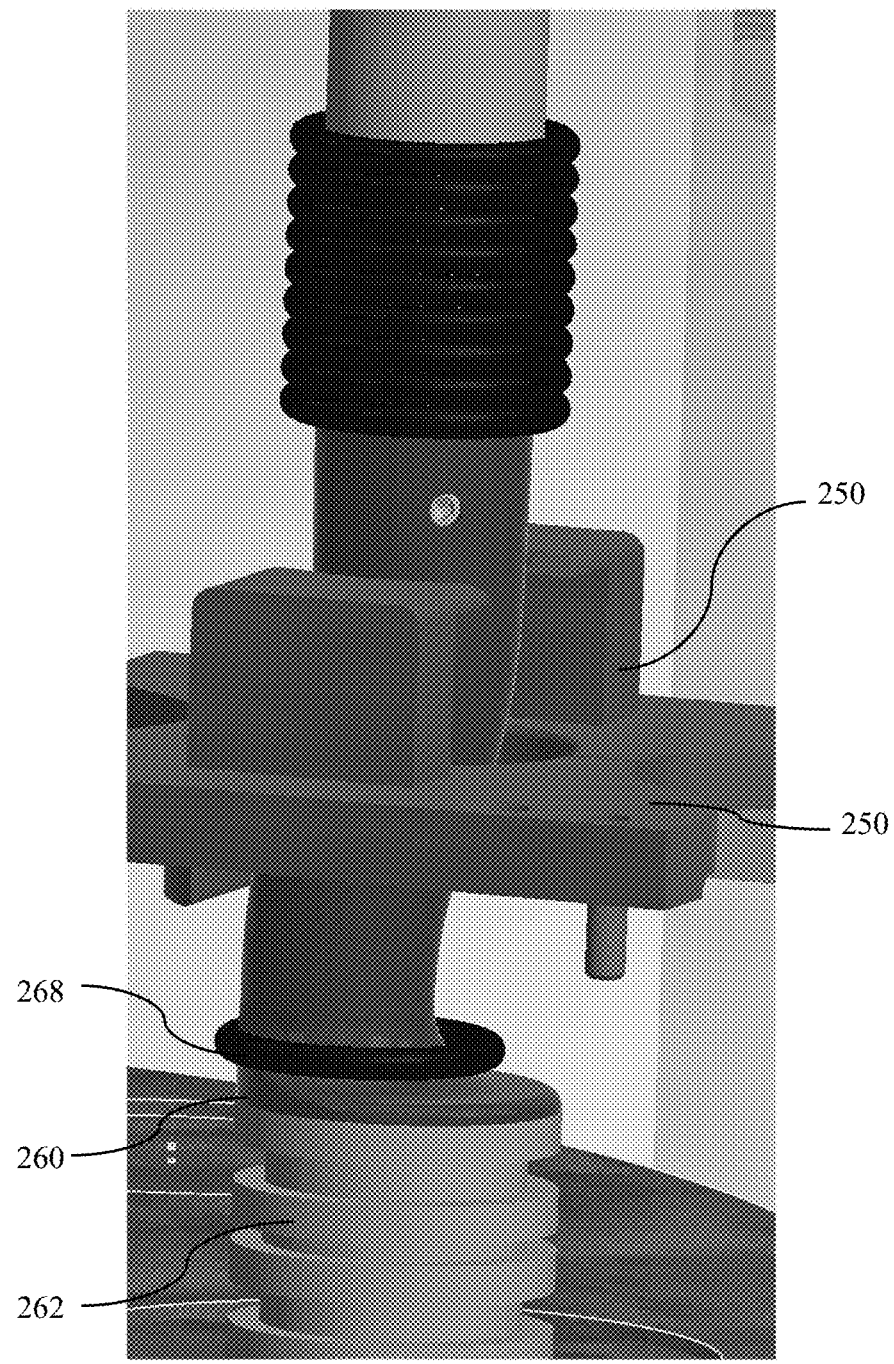
FIG. 19 illustrates a close-up view of a seal sleeve, an offset application cone, a pair of seal jaws, and a part for application of the seal thereto in an embodiment of the present invention.

For large cross-section seals, alternative retention and application apparatuses and methods may be needed. Specifically, a large cross-section to diameter ratio seal or O-ring may require specific jaw and cone designs. Specifically, FIG. 17 illustrates a jaw 250 that may have an upper gripper 252 that may be utilized, when operated in pairs in side-by-side positioning, to surround and remove a seal from a seal sleeve and allow it to drop onto a seal cone 254, as illustrated in FIG. 18, showing seal cone 254 having an offset shaft 256 extending from a base 258. The dropped seal may follow the offset shaft 256, resting with one edge of the seal extending over the base edge 260 and a part 262 thereunder. The jaw 250 may further have a lower protrusion 264 having a surface that may extend lower than an arced angled surface 266. The protrusion 264 may force an edge of the seal 268 down the base and onto the desired position of the part 262 thereunder. The jaw 250, then traveling downwards, uses the arced angled portion 266 to stretch the seal around the seal cone edge 260 and into full resting position on the part 262 thereunder. The lower protrusion 264, may therefore slide along the outside of the cone 254 and part 262 thereunder, pushing the seal into position on the part 262.

Figure 20:
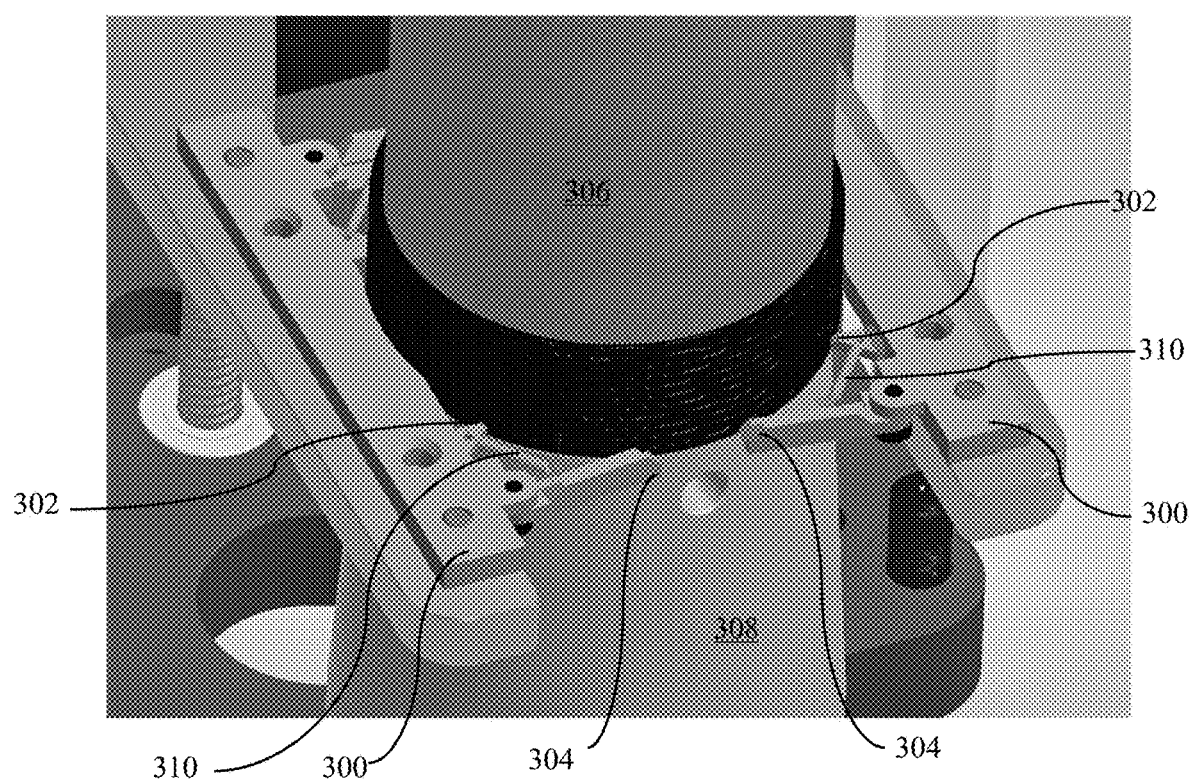
FIG. 20 illustrates a close-up view of a pair of seal jaws, a seal sleeve, a plurality of seals, and an application cone in an embodiment of the present invention.

In yet another alternate embodiment of the present invention, illustrated in FIG. 20, a small cross-section to diameter ratio seal may require additional O-ring contact points using a jaw type useful for handling the same. Specifically, as illustrated in FIG. 20, a pair of jaws 300 may be utilized to provide the necessary contact points to easily separate and move a small cross-section seal. Each jaw 300a, 300b may have two fixed contact points 302 and two floating contact points 304 on opposite sides thereof that may separate a seal on a sleeve 306 and move the same down a cone 308. The fixed contact points 302 may rigidly follow the cone 308 using a programmed path of a servo drive system of the jaws 300 as the jaws 300 traverse the cone 308 downwardly. The floating contact points 304 may contact the cone 308 during the jaw inward travel movement toward the sleeve 306 and/or cone 308 and expand, via springs 310, upon contacting the cone 308. The expansion action may thus allow constant contact with the tapered surface of the cone during downward travel. The result may therefore be that the jaws 300 combine to provide eight simultaneous points of contact on the seal to be installed through the duration of the travel of the jaws down the cone 308. With all eight points of contact on the seal applied simultaneously, the lower rigidity of the small cross-section seal may therefore have enough contact acting upon it to retain parallelism of the seal as it traverses down the cone 308 and onto the part thereunder (not shown). Thus, the seal may follow a more consistent path from the seal sleeve to the seal cone and then to the part thereunder.

Figure 10:
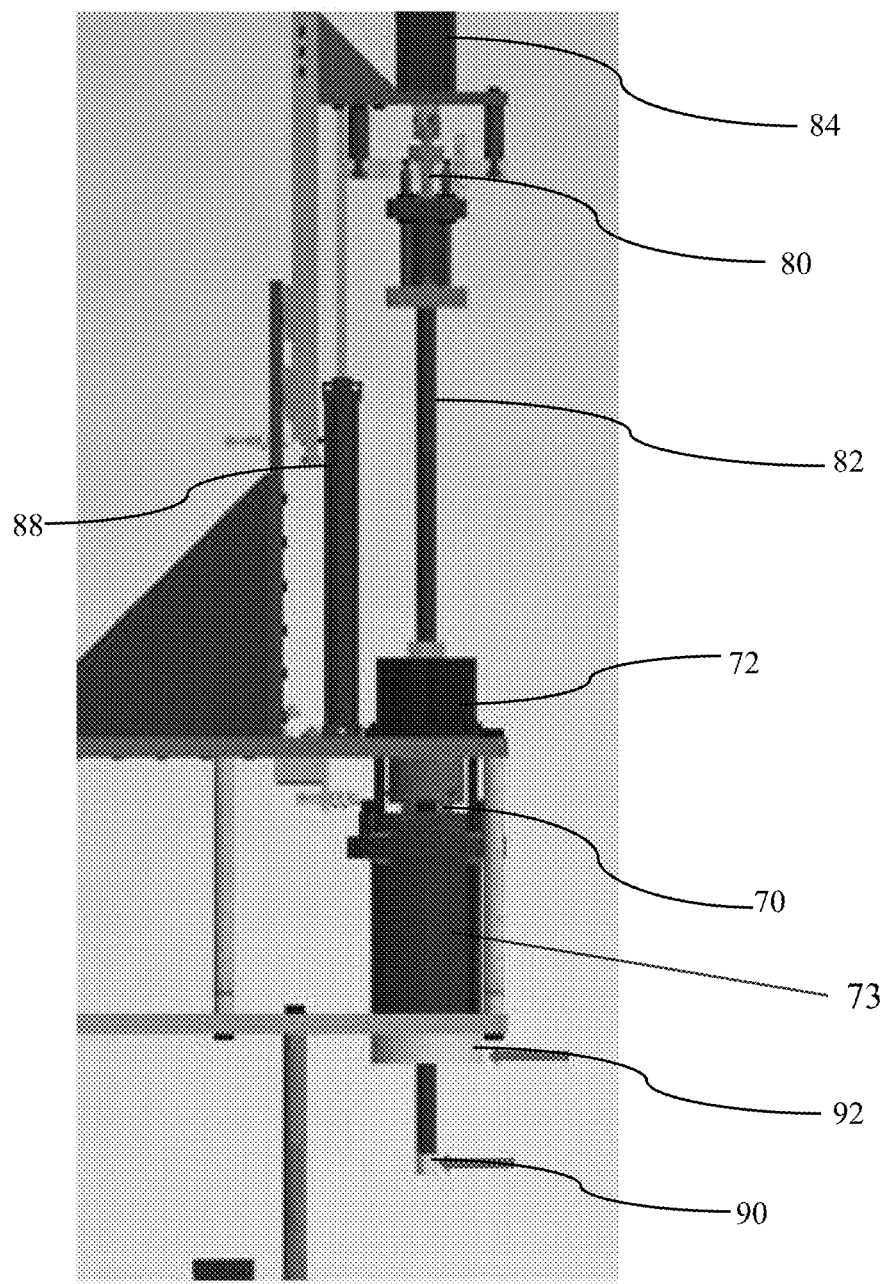
FIG. 10 illustrates quick-change mounts for a cone and a sleeve of seals in an embodiment of the present invention.

Relative independent movements of the sleeve 30 and the cone 32 (as well as other sleeves and cones described herein) may further allow each to be removed and replaced quickly. Specifically, as illustrated in FIG. 10, the apparatus 10 is illustrated without a cone or a sleeve thereon. At the bottom of shaft 82 may be a quick-change mount 90 allowing for a cone to be attached and removed quickly. The quick-change mount 90 may have elements that may mate with receiving elements on a cone to hold the same in place. Thus, when the sleeve is raised from the cone 32, as shown in FIG. 9B, and the cone is raised and cleared from a part thereunder, a user may manually remove the cone 32 from the shaft 82 and replace the same with another cone if needed. For example, the quick-change mount 90 may have a spring and ball lock system for quick install and removal of each of the cone types. Further, the cones may be set using set-screw pins.

Likewise, the sleeve 30 may be mounted to a quick-change mount 92. Thus, after the cone 32 is removed, the sleeve 30 may be quickly removed from the quick-change mount 92 and replaced as needed, such as when the sleeve 30 is empty of seals, or if different seals are desired. Thus, when the sleeve 30 is raised, the cone 32 is raised and removed, the sleeve 30 may be removed as well. The shaft 82 is quickly moved upwardly via an actuator 88, for example an air cylinder, that may raise the motor 84, the screw 80, the carriage 86, and the shaft 82 together, thereby moving the shaft 82 out of the way of the sleeve 30 so that the sleeve 30 may be removed and/or replaced. Once replaced, the same or a different cone may be mounted to the quick-change mount 90. The newly added cone may then be lowered into proper position over a part via motor 84, and the newly added sleeve may then be lowered over the newly added cone. The quick-change mount 92 may be, in a preferred embodiment, a spring plunger that may fasten the sleeve in place. Specifically, a spring-loaded pin (not shown) may extend from a side of sleeve mount 92, which may protrude through the sleeve mount 92 and into a hole on the seal sleeve 30 thereby holding the seal sleeve 30 in place. Pulling the spring-loaded pin may quickly release the seal sleeve 30 from the sleeve mount 92, therefore allowing the seal sleeve to be removed from sleeve drive system 73.

Figure 11:
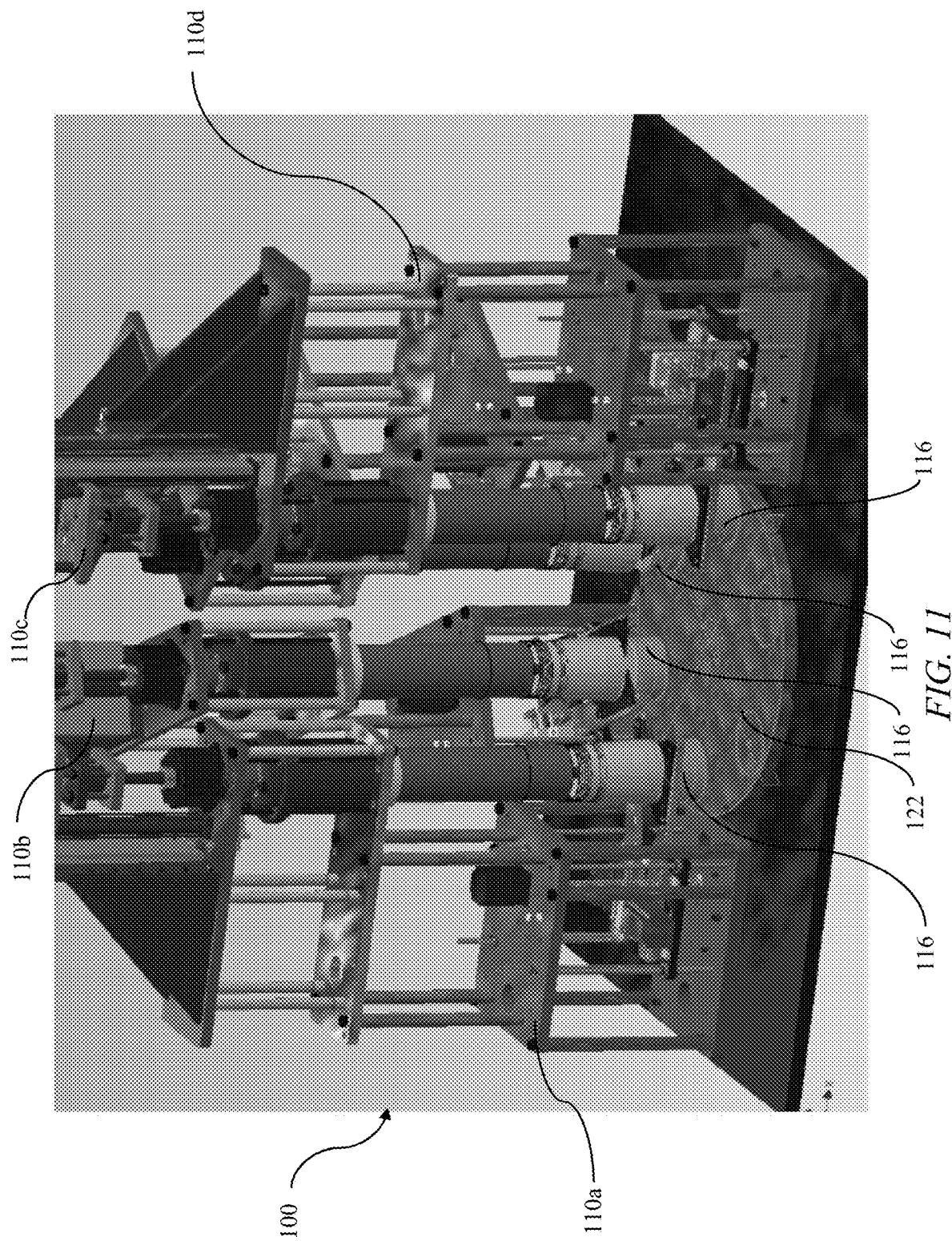
FIG. 11 illustrates a perspective view of a seal applicator system comprising a plurality of seal applicator apparatuses in an embodiment of the present invention.

FIG. 11 illustrates an alternate embodiment of the present invention, showing a seal application system 100 having a turntable 120 having a plurality of parts 116 thereon, and a plurality of seal applicator apparatuses 110a, 110b, 110c, 110d disposed therearound. The seal applicator apparatuses 110a-110d may be generally the same as described above with reference to the seal applicator apparatus 10. In the system 100, the plurality of applicator apparatuses 110a-110d may work in concert to add a plurality of seals to a plurality of parts at the same time or nearly at the same time. Thus, application of seals may be done in parallel to each other thereby saving time.

Moreover, the seal applicator apparatuses 110a-110d, illustrated in FIG. 11, may have different types and sizes of seals thereon to attach to different parts or, alternatively, different grooves within the same part. For example, a part may have 4 different grooves, each requiring a different size and shape of seal to be applied thereto. Each applicator apparatus 110a-110d may apply a specific seal to a specific location on the part, and thus when the turntable 122 rotates, each part may have all of the seals applied thereto via each of the seal applicator apparatuses 110.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

I claim:

1. A seal applicator apparatus comprising:
a base module comprising a surface on which a part is configured to be disposed;
a seal sleeve above the base module, the seal sleeve configured to hold a plurality of seals thereon;
a seal application surface disposed beneath the seal sleeve providing a surface for movement of a seal from the seal sleeve to the part configured to be disposed on the base module; and
a seal gripper applicator comprising a pair of gripper elements that move inwardly and outwardly in a coordinated manner, wherein the gripper elements each comprise seal contact surfaces wherein the seal contact surfaces engage above the seal on the seal sleeve and move the seal downwardly over the seal application surface and into a groove on the part configured to be disposed on the base module.

2. The seal applicator apparatus of claim 1 wherein the base module comprising a movable surface and is configured to hold a plurality of parts, each of which is configured to move to a position beneath the seal sleeve and the seal application surface.

3. The seal applicator apparatus of claim 1 wherein the seal sleeve is releasably attached to a shaft.

4. The seal applicator apparatus of claim 3 wherein the seal sleeve is releasably attached to the shaft via a removable pin.

5. The seal applicator apparatus of claim 1 wherein the seal sleeve and the seal application surface are movable vertically.

6. The seal applicator apparatus of claim 1 wherein the seal sleeve and the seal application surface are movable vertically via a motor.

7. The seal applicator apparatus of claim 1 wherein the seal sleeve and the seal application surface are releasably attached to a shaft.

8. The seal applicator apparatus of claim 1 wherein the seal sleeve and the seal application surface are attached to a shaft, wherein the shaft is movable vertically via a motor.

9. The seal applicator apparatus of claim 1 wherein the seal application surface is frustoconical having a first diameter at the top thereof and a second diameter at the bottom thereof, wherein the first diameter is smaller than the second diameter.

10. The seal applicator apparatus of claim 9 wherein the second diameter at the bottom of the seal application surface is wider than the part configured to be disposed on the base module.

11. The seal applicator apparatus of claim 1 wherein the seal application surface comprises a shaft and a base, wherein the shaft extends vertically from the base and is attached to a position on the base that is offset from center.

12. The seal applicator apparatus of claim 1 wherein the seal application surface is releasably attached to a shaft.

13. The seal applicator apparatus of claim 1 wherein the seal sleeve comprises a rotating cam element having a hook element at a bottom thereof, wherein the rotating cam element is configured to rotate the hook element outside a surface of the seal sleeve to hold a seal thereon and further to rotate the hook element inside the surface of the seal sleeve to release the seal thereon.

14. The seal applicator apparatus of claim 13 wherein the rotating cam element comprises a shoulder, wherein the rotating cam element is configured to rotate the shoulder outside a surface of the seal sleeve to hold a second seal when the hook element is rotated inside the surface of the seal sleeve, and to further rotate the shoulder inside the surface of the seal sleeve when the hook element is rotated outside the surface of the seal sleeve.

15. The seal applicator apparatus of claim 1 wherein each of the seal contact surfaces comprises an arcuate surface for engaging a seal on the seal sleeve and pushing the seal down the seal application surface to the part thereunder.

16. The seal applicator apparatus of claim 1 wherein each of the seal contact surfaces comprises at least one fixed contact point and at least one expandable contact point.

17. The seal applicator apparatus of claim 16 wherein the at least one expandable contact point may comprise a flexible element allowing the at least one expandable contact point to expand when the seal gripper applicator moves the seal down the seal application surface.

18. The seal applicator apparatus of claim 1 wherein the seal gripper applicator is movable vertically via a motor.

19. The seal applicator apparatus of claim 1 wherein the pair of gripper elements move inwardly and outwardly in a coordinated manner via a motor.

20. A system for applying seals to parts comprising:
   the seal applicator apparatus of claim 1; and
   a second seal applicator apparatus comprising:
      a second seal sleeve above the base module, the second seal sleeve configured to hold a second plurality of seals thereon;
      a second seal application surface disposed beneath the second seal sleeve providing a surface for movement of a seal from the second seal sleeve to the part or a second part; and
      a second seal gripper applicator for moving a second seal from the second seal sleeve down the second seal application surface.

\* \* \* \* \*